3,017,418
3,17-BISOXYGENATED ANDROST-2-EN-1-ONES AND INTERMEDIATES
Raymond M. Dodson, Park Ridge, and Arthur H. Goldkamp, Glencoe, Ill., assignors to G. D. Searle & Co., Chicago, Ill., a corporation of Delaware
No Drawing. Filed Jan. 20, 1960, Ser. No. 3,494
6 Claims. (Cl. 260—397.4)

The present invention is concerned with 1-ketosteroids and intermediates in their manufacture. The 1-ketosteroids especially contemplated are 3,17-bisoxygenated androst-2-en-1-ones of the structural formula

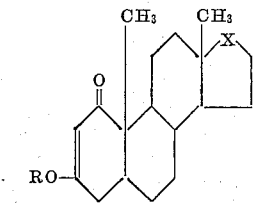

wherein R is selected from the group consisting of hydrogen, lower alkyl, and lower alkanoyl radicals; and X is selected from the group consisting of carbonyl, β-hydroxymethylene, β-(lower alkanoyl)oxymethylene, [α-(lower alkyl) - β - hydroxy]methylene, and [α - (lower alkyl)-β-(lower alkanoyl)oxy]methylene radicals. The lower alkyl radicals encompassed by the R and X terms are, for example, methyl, ethyl, propyl, butyl, pentyl, hexyl, and the branched-chain isomers thereof. Lower alkanoyl radicals represented in the R and X designations are typified by formyl, acetyl, propionyl, butyryl, valeryl, caproyl, and the branched-chain isomers thereof, said groups being the acyl radicals of alkanoic acids containing fewer than 7 carbon atoms.

It will be recognized by those persons skilled in the art that the compounds of this invention wherein R is hydrogen can exist in the enol or keto forms, as shown by the following partial formulae:

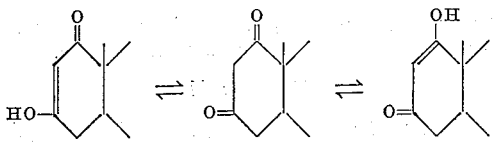

For the purpose of convenience, the instant compounds have been designated herein as existing in the enol form, but this is not meant to be limiting in any way.

A starting material suitable for the manufacture of the compounds of this invention is 1α,3β-dihydroxy-androstan-17-one. Oxidation of the latter ketone, typically with chromic acid in acetone, affords the instant 3-hydroxyandrost-2-ene-1,17-dione. Treatment of this diketone with a lower alkanoic acid anhydride yields the corresponding 3-enol esters, while reaction with a lower alkanol results in the corresponding 3-enol ethers. For example, acylation of the aforementioned 3-hydroxyandrost-2-ene-1,17-dione with acetic anhydride in pyridine produces 3-acetoxyandrost-2-ene-1,17-dione, while reaction with ethanol in the presence of a suitable catalyst such as p-toluenesulfonic acid affords 3-ethoxyandrost-2-ene-1,17-dione. When 3-hydroxyandrost-2-ene-1,17-dione is chemically reduced, preferably with sodium borohydride and potassium hydroxide in aqueous ethanol, the instant 3,17β-dihydroxyandrost-2-en-1-one is obtained.

The 17α-alkyl-17β-hydroxy compounds of this invention are obtained by oxidation of the corresponding 17α-alkyl-1α,3β,17β-triols. As a specific example, treatment of 17α-ethylandrostane-1α,3β,17β-triol with chromic acid in acetone affords 17α-ethyl-3,17β-dihydroxyandrost-2-en-1-one. The aforementioned triol is produced by reacting 1α,3β-dihydroxyandrostan-17-one with acetylene in the presence of potassium tertiary-pentoxide to yield 17α-ethynyl-1α,3β,17β-triol, then catalytically hydrogenating the latter compound, suitably in the presence of a palladium-on-carbon catalyst.

The instant 3,17β-di-(lower alkanoates) can be manufactured by treatment of the corresponding 3,17β-diols with an acylating agent under the proper conditions. For example, treatment of 3,17β-dihydroxyandost-2-en-1-one with excess acetic anhydride and pyridine results in 3,17β-diacetoxyandrost-2-en-1-one, while the reaction of 17α-ethyl-3,17β-dihydroxyandrost-2-en-1-one with isopropenyl acetate in the presence of a catalytic quantity of p-toluenesulfonic acid affords 3,17β-diacetoxy-17α-ethylandrost-2-en-1-one. Mild hydrolysis of these 3,17β-di-(lower alkanoates), for example with dilute hydrochloric acid at room temperature, yields the corresponding 17β-mono-(lower alkanoates).

In order to obtain the 3-mono-(lower alkanoates) of this invention, the corresponding diols are treated with a limited quantity of the acylating agent. As a specific example, 3,17β-dihydroxyandrost-2-en-1-one in pyridine is reacted with one equivalent of acetic anhydride to produce 3-acetoxy-17β-hydroxyandrost-2-en-1-one.

The compounds of this invention are useful as a result of their valuable pharmacological properties. They have, for example, hormonal properties as evidenced by their ability to produce the androgenic response typical of testosterone.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight unless otherwise noted.

*Example 1*

A solution of 6 parts of 1α,3β-dihydroxyandrostan-17-one in 110 parts of acetone, under nitrogen, is cooled by means of an ice bath. To this solution is added, with stirring over a period of about 10 minutes, 11 parts by volume of an aqueous solution containing 2.97 parts of chromium trioxide and 4.57 parts of concentrated sulfuric acid. Dilution of the reaction mixture with water results in precipitation of the crude product, which is collected by filtration and recrystallized from methanol to afford pure 3 - hydroxyandrost - 2 - ene-1,17-dione, M.P. 200–203.5°.

*Example 2*

A mixture of 6 parts of 3-hydroxyandrost-2-ene-1,17-dione, 30 parts of acetic anhydride, and 30 parts of pyridine is allowed to stand at room temperature for about 18 hours. The reaction mixture is diluted with ice water and the resulting precipitate collected by filtration. Recrystallization from aqueous methanol affords pure 3-acetoxyandrost-2-ene-1,17-dione, M.P. 143–144.5°.

The substitution of an equivalent quantity of propionic anhydride in the process of this example results in 3-propionoxyandrost-2-ene-1,17-dione.

*Example 3*

A mixture of 1.1 parts of 3-hydroxyandrost-2-ene-1,17-dione, 9 parts of ethanol, 0.1 part of p-toluenesulfonic acid monohydrate, and 45 parts of benzene is heated at reflux, under nitrogen, for about 6 hours. The water formed in the reaction codistils with the benzene and is removed by means of a water separator placed in the system. The reaction mixture is heated for about 30 minutes longer, during which time about 35 parts by volume of distillate is collected. The mixture is then cooled, diluted with benzene and ether, washed successively with aqueous sodium bicarbonate and water, dried over anhydrous sodium sulfate, and evaporated to dryness in vacuo. Recrystallization of the residue first from ether-hexane then from methylene chloride-ether affords pure 3-ethoxyandrost-2-ene-1,17-dione, M.P. 184–187.5°.

By substituting an equivalent quantity of methanol and otherwise proceeding according to the herein described processes, 3-methoxyandrost-2-ene-1,17-dione is obtained.

Example 4

To a solution of 27 parts of 3-hydroxyandrost-2-ene-1,17-dione in 5,000 parts of ethanol is added successively, at 0°, 10 parts of 10 N aqueous potassium hydroxide and a solution of 4 parts of sodium borohydride in 50 parts of water and 300 parts of ethanol. The reaction mixture is stirred at 0° for about 1¼ hours, then neutralized with glacial acetic acid, diluted with water, and extracted with methylene chloride. The organic layer is dried over anhydrous sodium sulfate and evaporated to dryness in vacuo. Adsorption of the residue on silica gel followed by elution with 2–10% ethyl acetate in benzene results in 3,17β-dihydroxyandrost-2-en-1-one. This substance, in methanol, exhibits an ultraviolet maximum at 255 millimicrons with a molecular extinction coefficient of 7,640.

Example 5

A mixture of 2 parts of potassium metal and 60 parts of tertiary-amyl alcohol is stirred with heating until the metal dissolves, then cooled and saturated with acetylene. To this mixture is added, with stirring at 0°, 5 parts of ether and 1.5 parts of 1α,3β-dihydroxyandrostan-17-one. Stirring is continued for about 4 hours, then the reaction mixture treated with about 60 parts of saturated aqueous ammonium chloride and about 200 parts of ether. The ether solution is washed with water, dried over anhydrous sodium sulfate, and evaporated to dryness under reduced pressure. The residue is absorbed on silica gel and eluted with 30–50% ethyl acetate in benzene to yield 17α-ethynylandrostane-1α,3β,17β-triol. This triol displays infrared maxima at 2.75 and 3.02 microns.

Example 6

A solution of 1.45 parts of 17α-ethynylandrostane-1α,3β,17β-triol in 50 parts of ethanol together with 0.3 part of 5% palladium-on-carbon catalyst is shaken in a hydrogen atmosphere until two molecular equivalents of hydrogen are absorbed. The catalyst is removed by filtration and the filtrate evaporated to dryness in vacuo. Crystallization of the residue from chloroform-benzene results in 17α-ethylandrostane-1α,3β,17β-triol, M.P. 151–152°.

Example 7

To an ice-cold solution of 4.5 parts of 17α-ethylandrostane-1α,3β,17β-triol in 200 parts of acetone is added, dropwise with stirring, 7 parts by volume of an aqueous solution containing 1.89 parts of chromium trioxide and 2.9 parts of concentrated sulfuric acid. The reaction mixture is stirred for about 20 seconds longer, then diluted with water. The resulting precipitate is collected by filtration and dried to afford 17α-ethyl-3,17β-dihydroxyandrost-2-en-1-one. In the ultraviolet, this substance displays a maximum at 255 millimicrons with a molecular extinction coefficient of 7,500. It possesses infrared maxima at 2.74, 2.9, and 5.83 microns.

By substituting an equivalent quantity of 17α-methylandrostane-1α,3β,17β-triol in the process of this example, 3,17β-dihydroxy-17α-methylandrost-2-en-1-one is obtained.

Example 8

A mixture of 5 parts of 3,17β-dihydroxyandrost-2-en-1-one, 20 parts of acetic anhydride and 20 parts of pyridine is allowed to stand at room temperature for about 16 hours. The reaction mixture is diluted with water and extracted with benzene. The organic layer is washed successively with dilute hydrochloric acid and water, dried over anhydrous sodium sulfate, and concentrated to dryness in vacuo to afford 3,17β-diacetoxyandrost-2-en-1-one, which displays infrared maxima at 5.75, 5.98, and 8.0 microns and an ultraviolet maximum at 233 millimicrons with a molecular extinction coefficient of about 3800.

By substituting an equivalent quantity of butyric anhydride and otherwise proceeding according to the herein described processes, 3,17β-dibutyroxyandrost-2-en-1-one is obtained.

Example 9

A mixture of 2 parts of 3,17β-diacetoxyandrost-2-en-1-one, 3.5 parts of concentrated hydrochloric acid, 50 parts of water, and 50 parts of tertiary butyl alcohol is stirred at room temperature for about 48 hours. The reaction mixture is treated with about 200 parts of ether. The ether layer is separated, washed with water, dried over anhydrous sodium sulfate, and evaporated to dryness in vacuo. The residue is recrystallized from aqueous methanol to afford pure 17β-acetoxy-3-hydroxyandrost-2-en-1-one, which possesses maxima in its infrared absorption spectrum at 2.74, 2.9, 5.74, 5.83, and 8.0 microns.

The substitution of an equivalent quantity of 3,17β-dibutyroxyandrost-2-en-1-one in the instant process results in 17β-butyroxy-3-hydroxyandrost-2-en-1-one.

Example 10

To a solution of 3 parts of 3,17β-dihydroxyandrost-2-en-1-one in 15 parts of pyridine is added 1.1 parts of acetic anhydride, and the mixture is allowed to stand at room temperature for about 15 hours. Dilution of the reaction mixture with cold water results in precipitation of the product, which is collected by filtration and dried to afford 3 - acetoxy-17β-hydroxyandrost-2-en-1-one. It exhibits maxima in the infrared at about 2.75, 5.73, 5.97, and 8.02 microns.

The substitution of an equivalent quantity of propionic anhydride in the process of this example results in 17β-hydroxy-3-propionoxyandrost-2-en-1-one.

Example 11

A mixture of one part of 17α-ethyl-3,17β-dihydroxyandrost-2-en-1-one, 2 parts of acetic anhydride, and 2 parts of pyridine is allowed to stand at room temperature for about 16 hours. The reaction mixture is diluted with cold water, and the resulting precipitate collected by filtration. Recrystallization from aqueous ethanol affords 3-acetoxy - 17α - ethyl-17β-hydroxyandrost-2-en-1-one. This substance possesses infrared absorption maxima at about 2.74, 5.73, 5.98, and 8.02 microns, and a maximum in the ultraviolet at 234 millimicrons with a molecular extinction coefficient of about 4,000.

By substituting equivalent quantities of propionic anhydride and 3,17β-dihydroxy-17α-methylandrost-2-en-1-one and otherwise proceeding according to the herein described processes, 17β-hydroxy-17α-methyl-3-propionoxyandrost-2-en-1-one is obtained.

Example 12

A mixture of 3 parts of 17α-ethyl-3,17β-dihydroxyandrost-2-en-1-one, 16 parts of isopropenyl acetate, and 0.02 part of p-toluenesulfonic acid is heated at 100° for about 4 hours. The reaction mixture is cooled, neutralized with pyridine, and poured into approximately 100 parts of ether. The ether solution is washed with water, dried over anhydrous sodium sulfate, and concentrated to dryness in vacuo. Crystallization of the residue from aqueous ethanol yields 3,17β-diacetoxy-17α-ethylandrost-2-en-1-one.

By substituting equivalent quantities of isopropenyl propionate and 3,17β - dihydroxy-17α-methylandrost-2-en-1-one, and otherwise proceeding according to the herein described processes, 17α-methyl-3,17β-dipropionoxyandrost-2-en-1-one is obtained.

*Example 13*

A mixture of 2 parts of 3,17β-diacetoxy-17α-ethylandrost-2-en-1-one, 0.4 part of potassium bicarbonate, and 20 parts of methanol is heated at reflux, with stirring, for about 15 minutes. The reaction mixture is poured onto ice, acidified with hydrochloric acid, and extracted with methylene chloride. This organic extract is washed with water, dried over anhydrous sodium sulfate, and evaporated to dryness at reduced pressure. Recrystallization of the residue from aqueous methanol produces 17β - acetoxy-17α-ethyl-3-hydroxyandrost-2-en-1-one which possesses infrared absorption maxima at about 2.74, 5.74, 5.82, and 8.0 microns, and displays a maximum in the ultraviolet at 255 millimicrons with a molecular extinction coefficient of about 7,000.

The substitution of an equivalent quantity of 17α-methyl-3,17β-dipropionoxyandrost-2-en-1-one in the procedure of this example results in 3-hydroxy-17α-methyl-17β-propionoxyandrost-2-en-1-one.

What is claimed is:
1. A compound of the structural formula

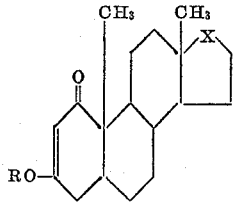

wherein R is selected from the group consisting of hydrogen, lower alkyl, and lower alkanoyl radicals; and X is selected from the group consisting of carbonyl, β-hydroxymethylene, β - (lower alkanoyl)oxymethylene, [α-(lower alkyl) - β - hydroxy]methylene, and [α-(lower alkyl)-β-(lower alkanoyl)oxy]methylene radicals.

2. 3-hydroxyandrost-2-ene-1,17-dione.
3. 3-acetoxyandrost-2-ene-1,17-dione.
4. 3-ethoxyandrost-2-ene-1,17-dione.
5. 3,17β-dihydroxyandrost-2-en-1-one.
6. 17α-ethyl-3,17β-dihydroxyandrost-2-en-1-one.

References Cited in the file of this patent
UNITED STATES PATENTS
2,833,792    Dodson et al. _____ May 6, 1958